United States Patent Office 3,362,980
Patented Jan. 9, 1968

3,362,980
METHOD FOR THE PREPARATION OF ALKYL VICINAL-POLYFLUOROFORMATES
Karl O. Christe and Attila E. Pavlath, Berkeley, Calif., assignors to Stauffer Chemical Company, New York, N.Y., a corporation of Delaware
No Drawing. Filed Nov. 23, 1964, Ser. No. 413,339
4 Claims. (Cl. 260—463)

This invention relates to an improved method for the preparation of alkyl vicinal-bis-fluoroformates. In particular, it refers to an improved method for preparing compounds of the class alkyl vicinal-bis-fluoroformate, whereby carbonate formation is eliminated and improved yields can be realized.

The preparation of alkyl vicinal-bis-fluoroformates is mentioned only once in the literature. Aldrich and Shepard (Journal of Organic Chemistry) 29, 11–15 (1964), describe the preparation of ethylene bis-fluoroformate. The preparation of ethylene bis-fluoroformate was carried out by reaction of ethylene glycol with carbonyl fluoride in ether solution at −80° C. In the previous method a yield of only 79 percent is realized. Sodium fluoride was required to absorb the hydrogen fluoride formed as a by-product in the reaction. By the fact that hydrogen fluoride is formed as a by-product there is a loss in fluorine values which does not occur in the present invention.

In an earlier work Emeleus and Wood (Journal of the Chemical Society, 1948, 2183–8), described the preparation of alkyl monofluoroformates from carbonyl chlorofluoride and the corresponding alkanol. The yield of alkyl mono-fluoroformate was relatively low and their preparation was accompanied by the formation of a considerable amount of dialkyl carbonate. Consequently, it can be assumed that if the method of Emeleus and Wood were attempted using vicinal-dihydric alkanols, as well as other polyhydric alcohols containing vicinal-dihydroxy groups, there also would result therefrom an undesirably high percentage of carbonate formation. In fact, the probability of internal carbonate formation is greater in vicinal-polyhydric alkanols than between monofunctional alkanols, since the polyhydric material does not require a second collision with another molecule to form the carbonate. In the vicinal structure steric factors highly favor carbonate formation once the monofluoroformate moiety exists. Whereas, in the case of the monohydric compounds a second reaction is necessary between the monofluoroformate and a monohydric alkanol to form the corresponding dialkylcarbonate.

A general object of the present invention is, therefore, to provide a new and improved method for preparing fluoroformates of polyhydric alcohols, especially α or 1:2, adjacently substituted vicinal-diols.

A more specific object is a process for the preparation of said fluoroformates in high yield and with a minimum of carbonate formation and minimum loss in fluorine values.

Pursuant to the above-mentioned and yet further objects, it has been found that vicinal-polyhydric alcohols and especially α or 1:2 dihydroxy alcohols can be conveniently reacted with carbonyl chlorofluoride in the presence of a tertiary amine as a catalyst. The distinct advantage afforded by the present method in forming vicinal-fluoroformates is substantially reduced amounts of corresponding carbonate formation which normally occur when other methods are employed. The reaction may be represented by the following equation:

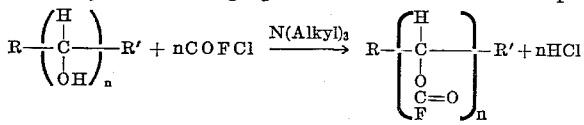

wherein $n$ is an integer from 2 to 6 inclusive, R and R' may be hydrogen, alkyl, aryl, cycloalkyl, alkenyl, cycloalkenyl, aralkyl or alkaryl which may be the same or different and each of which may bear one or more simple substituents such as, for example, halo, alkoxy, carboxy, carbalkoxy, cyano, amino or nitrile groups.

The term vicinal refers to neighboring or adjacent carbon atom substitution within a molecule. By polyhydric alcohols we mean those compounds which are derivatives of aliphatic hydrocarbons, either saturated or unsaturated, formed by the replacement of two or more hydrogen atoms by two or more monovalent hydroxyl groups, each being attached to a different carbon atom. The dihydric alcohols, with two hydroxyl groups in their molecular structure, are known as glycols; the trihydric alcohols, with three hydroxyls, include glycerol and 1,2,6-hexanetriol. Alcohols containing four, five and six hydroxyls are known. The present invention concerns primarily the alcohols containing at least α or 1:2, adjacently (vicinal) substituted polyhydric alcohols. The best known examples further operable within the scope of the present invention include such vicinial-diols as ethylene glycol, propylene glycol, 1:2-dihydroxy butylene glycol, glycerol, 1,2,6-hexanetriol, erythritol, pentaerythritol, arabitol, xylitol, adonitol, inositol and even, for example, the class of simple sugars as the hexoses and the like.

The vicinal-bis-fluoroformates of the present invention find great utility as precursors for vicinal-difluoroalkanes. These bis-fluoroformates can be converted by decarboxylation according to the method described by Nakanishi et al. (J. Am. Chem. Soc. 77, 3099 and 5033 (1955)). The decarboxylation can be achieved by means of boron trifluoride-etherate, boron trifluoride-tetrahydrofuranate, or less effectively, on warming with pyridine. They can be used also as intermediates for organic compounds useful in agricultural chemicals and pharmaceuticals.

The reaction of the present invention can be carried out under many varying conditions to prepare the vicinal fluoroformates. The reaction is conducted generally under substantially anhydrous conditions to minimize hydrolysis of the desired fluoroformates. The vessels used for the reaction should be of substantial material as will allow operation at high pressures and moderate temperatures when needed. Provision should be made to remove excess carbonyl chlorofluoride after the reaction is completed. Some form of agitation of the reactants is desirable in order to achieve a more intimate contact. The products of the reaction can be separated by conventional methods of vacuum distillation in the case of liquids, and crystallization in the case of solids.

The reaction between carbonyl chlorofluoride and a vicinal-diol in the presence of a tertiary amine will proceed at atmospheric and superatmospheric pressures. However, the preferred pressure is superatmospheric. An excess of carbonyl chlorofluoride is used to assist in transferring the equilibrium established in the reactor to the desired products and decrease carbonate formation.

The proportion of carbonyl chlorofluoride to vicinal-polyhydric alcohol is not narrowly critical. The preferred range of reactants is at least 1 mole of carbonyl chlorofluoride for each hydroxyl equivalent present in the polyhydric alcohol. The particularly preferred range is 1 to 2 mole of carbonyl chlorofluoride for each hydroxyl equivalent present in the polyhydric compound. An excess of carbonyl chlorofluoride, as stated supra, is desirable to decrease the amount of carbonate formation. The use of an inert solvent, such as toluene or benzene, was found to be desirable although not necessary. The use of said inert solvents was found to assist in decreasing carbonate formation thereby increasing the yield of alkyl vicinal-fluoroformate.

Although the reaction of the present invention will proceed with or without a catalyst, the use of a basic catalyst was found to be necessary in order to obtain maximum conversions and yields of vicinal-polyfluoroformates. In general, any saturated tertiary amine may be employed as a catalyst. The preferred tertiary amine for our reactions was tri-n-butylamine. Good results are obtained when between 1 percent and 20 percent catalyst by weight is employed. The amount of catalyst is based on the weight of the polyhydric alcohol that is used.

The temperature of the reaction is not critical and is kept as low as operability permits. It was found that at higher temperatures an increased amount of carbonate was formed by the reaction. Preferably the temperature range should be above 0° C. and as high as the polyhydric alcohol used requires, within the given conditions of this invention. Each vicinal-polyhydric alcohol will have its particularly favorable conditions as to temperature, pressure and reaction time, but will be within the limits of this invention. In general, the maximum temperature need not be above about 150° C.

Broadly considered, practice of the invention involves contacting a polyhydric material containing at least one vicinal-diol substitution with carbonyl chlorofluoride in the presence of a saturated tertiary amine at autogeneous pressures. Specific temperatures employed are dependent upon the particular starting material utilized. Pressures may be atmospheric or elevated, but pressures developed autogeneously are preferred.

The process of the invention may be suitably carried out by introducing the gaseous carbonyl chlorofluoride into a cooled pressure vessel containing the vicinal-polyhydric material as defined above, solvent and appropriate amount of tertiary amine as catalyst. The reactants in the reactor vessel are agitated by some suitable means for a time sufficient to convert the vicinal-polyhydric material to vicinal-polyfluoroformate material. The gaseous material is then removed from the reactor and recovery by appropriate means is made of said vicinal-polyfluoroformate material.

The following example illustrates the process of this invention.

*Example*

A mixture of ethylene glycol (24 g., 0.39 mole), 2 ml. of tri-n-butylamine and 80 g. of benzene were filled into a 350 ml. stainless steel lecture bottle. The reactor was cooled externally with ice water and carbonyl chlorofluoride (145 g., 1.4 moles) was added. The lecture bottle was fitted with a pressure gauge and sealed. It was placed on a shaker for agitation at room temperature. A final pressure of 250 pounds per square inch developed during the 40 hours on the shaker. The gases were bled off and the crude product was analyzed initially by gas chromatography. The analysis indicated an approximate conversion of 99 percent of the starting material, ethylene glycol. The product was made up as 98.9 percent ethylene bis-fluoroformate and 1.0 percent ethylene carbonate. The product was treated with anhydrous calcium chloride, filtered and isolated by vacuum distillation. The ethylene bis-fluoroformate that was isolated had the following properties: boiling point 33–34° C. at 1.55 mm. Hg; refr. index 1.3673 at 25° C.; density 1.435 at 26° C.

*Analysis.*—For $C_4H_4O_2F_2$, calculated, C, 31.17; H, 2.60; F, 24.68. Found, C, 31.81; H, 2.88; F, 23.2.

The procedure as given in the example is equally applicable to the preparation of other alkyl vicinal-polyfluoroformates as stated herein supra. The distinct advantage therein being the minimal carbonate formation. This advantage results when a tertiary amine is used to catalyze the reaction between carbonyl chlorofluoride and a vicinal-polyhydric alcohol.

Various changes and modifications may be made in the process described herein as will be apparent to those skilled in the chemical arts. It is accordingly intended that the present invention only be limited by the scope of the appended claims.

We claim:

1. A method for the preparation of alkyl vicinal-polyfluoroformates comprising reacting a corresponding vicinal-polyhydric alcohol with carbonyl chlorofluoride in the presence of a catalytic amount of tri-n-butyl amine.

2. A method for the preparation of 1,2-ethylene bis-fluoroformate comprising reacting ethylene glycol with carbonyl chlorofluoride in the presence of a catalytic amount of tri-n-butyl amine.

3. The method which comprises reacting under substantially anhydrous conditions a vicinal-polyhydric alcohol with carbonyl chlorofluoride in the presence of a catalytic amount of a tri-n-butyl amine, wherein the carbonyl chlorofluoride is employed in at least molar hydroxy-equivalent amounts of said alcohol, at a temperature above 0° C. and at superatmospheric pressure to obtain the corresponding alkyl vicinal-polyfluoroformate, and recovering said alkyl vicinal-polyfluoroformate as product.

4. The method which comprises reacting under substantially anhydrous conditions an ethylene glycol with carbonyl chlorofluoride in the presence of a catalytic amount of tri-n-butyl amine wherein the carbonyl chlorofluoride is employed in at least a 2:1 molar ratio with the ethylene glycol at a temperature above 0° C. and at superatmospheric pressures to obtain 1,2-ethylene bis-fluoroformate, and recovering said 1,2-ethylene bis-fluoroformate as product.

No references cited.

CHARLES B. PARKER, *Primary Examiner.*

B. BILLIAN, *Assistant Examiner.*